United States Patent
Aravot et al.

(10) Patent No.: US 10,346,248 B2
(45) Date of Patent: Jul. 9, 2019

(54) FAILURE RESISTANT VOLUME CREATION IN A SHARED STORAGE ENVIRONMENT

(71) Applicant: Red Hat Israel, Ltd., Raanana (IL)

(72) Inventors: Liron Aravot, Ramat Gan (IL); Adam Gerard Litke, Bethel Park, PA (US); Nir Soffer, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 198 days.

(21) Appl. No.: 15/190,482

(22) Filed: Jun. 23, 2016

(65) Prior Publication Data
US 2017/0371568 A1   Dec. 28, 2017

(51) Int. Cl.
| | |
|---|---|
| G06F 3/06 | (2006.01) |
| G06F 11/14 | (2006.01) |
| G06F 9/455 | (2018.01) |
| G06F 11/07 | (2006.01) |

(52) U.S. Cl.
CPC .............. *G06F 11/14* (2013.01); *G06F 3/067* (2013.01); *G06F 3/0614* (2013.01); *G06F 3/0665* (2013.01); *G06F 9/45558* (2013.01); *G06F 11/0757* (2013.01); *G06F 2009/45579* (2013.01)

(58) Field of Classification Search
CPC ...... G06F 3/0619; G06F 3/065; G06F 3/0689; G06F 9/45558
See application file for complete search history.

(56) References Cited

U.S. PATENT DOCUMENTS

| | | | |
|---|---|---|---|
| 6,343,324 B1 | 1/2002 | Hubis et al. | |
| 7,594,072 B2 | 9/2009 | Osaki et al. | |
| 7,636,818 B2 | 12/2009 | Tamura et al. | |
| 8,090,907 B2 | 1/2012 | Ainscow et al. | |
| 8,151,033 B2 | 1/2012 | Dake | |
| 9,081,842 B1 | 7/2015 | Natanzon et al. | |
| 9,116,847 B2 | 8/2015 | Liu et al. | |
| 9,305,009 B1 | 1/2016 | Bono et al. | |
| 9,529,679 B2 * | 12/2016 | Bloom ................ | G06F 11/1448 |
| 9,588,793 B2 * | 3/2017 | Warszawski ........ | G06F 9/45558 |
| 2014/0245026 A1 | 8/2014 | Bates | |
| 2016/0147561 A1 * | 5/2016 | Murata ................... | G06F 9/466 |
| | | | 718/101 |

OTHER PUBLICATIONS

Kannan, Karthikeyan, "VIOS Shared Storage Pool and Thin Provisioning", Capgemini, Jul. 3, 2013, 12 pages, http://www.ibm.com/developerworks/aix/library/au-aix-vios-clustering/.

Jagdale, Varsha, "Using the Storage Pools page in Server Manager to Create Storage Spaces", Dec. 6, 2012, 13 pages, https://blogs.technet.microsoft.com/filecab/2012/12/06/using-the-storage-pools-page-in-server-manager-to-create-storage-spaces/.

"VMware® VMFS Volume Management" 2009, 8 pages, http://www.vmware.com/files/pdf/vmfs_resig.pdf.

* cited by examiner

*Primary Examiner* — Reginald G Bragdon
*Assistant Examiner* — Edward Wang
(74) *Attorney, Agent, or Firm* — Lowenstein Sandler LLP

(57) ABSTRACT

Systems and methods for data storage management technology that use task identifiers to manage tasks and ensure storage modifications occur without unnecessary task duplication. An example method may comprise: generating a task identifier on a first device; transmitting a request comprising the task identifier to create a task on a second device, the task being associated with the task identifier and comprising the allocation of a data storage portion on a shared storage; determining a reply to the task is missing; and in response to determining the reply is missing, detecting whether the task was created on the second device.

20 Claims, 6 Drawing Sheets

FAILURE RESISTANT VOLUME CREATION IN A SHARED STORAGE ENVIRONMENT

TECHNICAL FIELD

The present disclosure is generally related to data storage management, and is more specifically related to managing storage creation tasks in a shared storage environment.

BACKGROUND

The virtualization of a data center results in a physical system being virtualized using virtual machines to consolidate the data center infrastructure and increase operational efficiencies. A virtual machine (VM) may be an emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
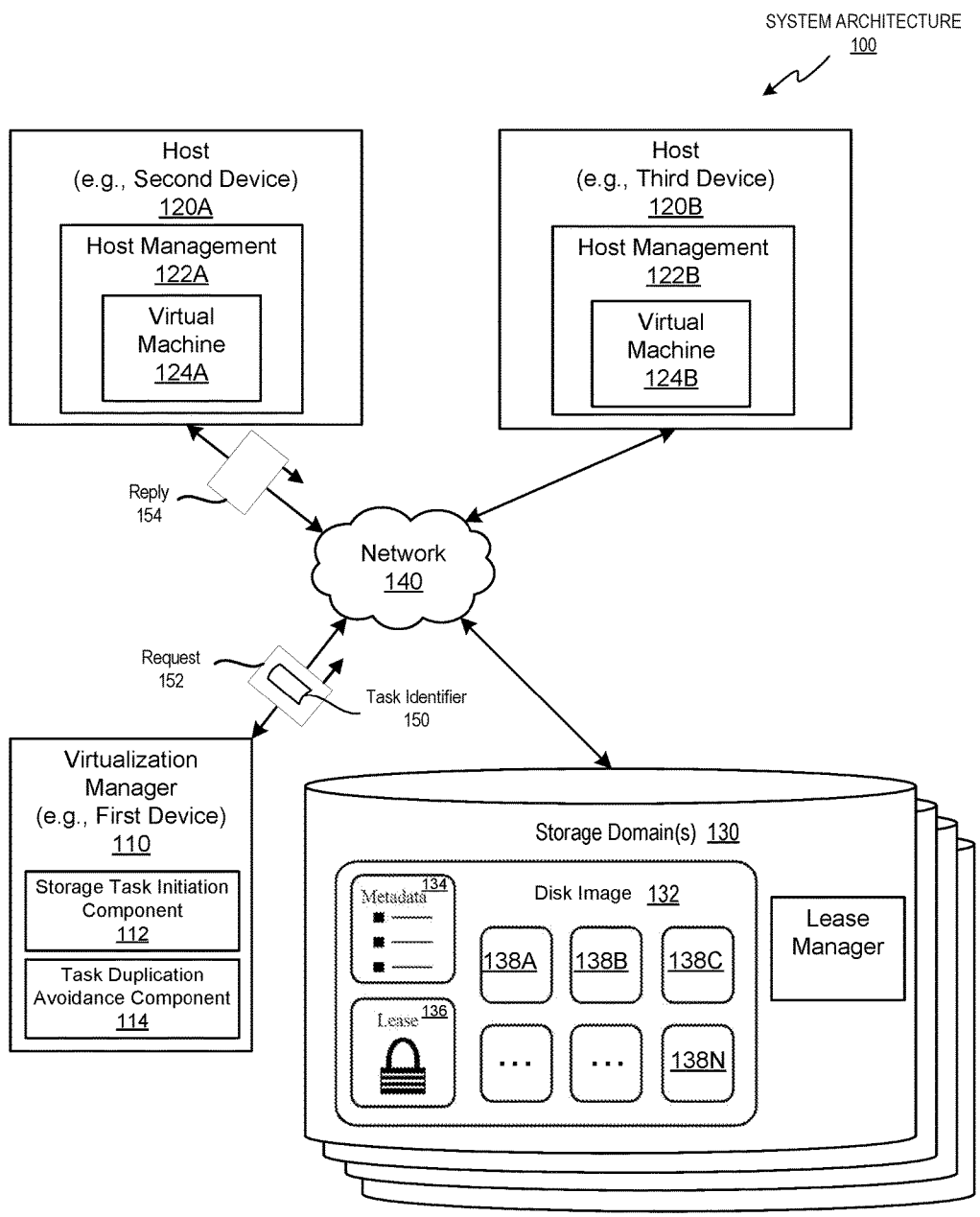
FIG. 1 depicts a high-level diagram of an example system architecture operating in accordance with one or more aspects of the present disclosure.

Described herein are methods and systems for data storage management technology that uses task identifiers to manage tasks and ensure storage modifications occur without unnecessary task duplication. Computing environments often include storage management functionality for managing the use and reuse of shared storage. The storage manager may modify the shared storage by initiating the creation of one or more tasks that are executed by a device with access to the shared storage. Some of the tasks may complete and other tasks may fail. When a task fails, the storage manager may create another task to modify the shared storage. In some instances, a first task may seem to fail because a status message was lost but may actually have been scheduled to run or may have already completed. The storage manager may be unaware the status message was lost and may incorrectly determine the original job failed and create a duplicate job. Duplicate jobs may result in wasted resources, and under certain circumstances, may cause data duplication or corruption.

In one example, the technology discussed herein may involve a first device (e.g., virtualization manager) that generates a task identifier and initiates a creation of a task on a second device (e.g., host system). The second device may create the task and may assign the task identifier generated by the first device to the task. The task may involve allocating a data storage portion on a shared storage and one or more other operations for creating a new storage volume. The first device may expect a reply from the second device after initiating the creation of the task and may determine, after some period of time, that the reply is missing. The technology disclosed herein may enable the first device to analyze whether the task failed using the task identifier, before requesting the creation of another task. The analysis may involve determining whether the second device is accessible and whether the second device has created, scheduled, or completed the task.

The technology disclosed herein may be advantageous because in one example it may enable the first device (e.g., virtualization manger) to ensure that a task is completed and avoid creating duplicate tasks. In one example, this may be done by employing a task identifier that is created on the first device, as opposed to the second device. In traditional systems, a first device may transmit a request to a second device, which generates both the task and the task identifier. The task identifier may then be sent to the first device in a reply message. Under certain circumstances, the reply message may not be received by the first device. As a result, the first device may not have the task identifier and may not be able to check to see if a corresponding task was created, scheduled, or completed. The technology disclosed herein may enhance the traditional systems by generating the task identifier on the first device and sending it to the second device when requesting the creation of the task. Therefore, the first device has the task identifier even if subsequent replies are not received. This may enable the first device to check if the task was created on the second device and avoid duplication of tasks. Various aspects of the above referenced methods and systems are described in details herein below by way of examples, rather than by way of limitation.

FIG. 1 illustrates an example system architecture 100 in which implementations of the disclosure may operate. The system architecture 100 may include a virtualization manager 110, a plurality of hosts 120A, 120B, and one or more storage domains 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Virtualization manager 110 may be hosted by a computer system (described in more details herein below with references to FIGS. 5 and 6) and include one or more computer programs executed by the computer system for centralized management of the system architecture 100. In one implementation, the virtualization manager 110 may comprise various interfaces, including administrative interface, reporting interface, and/or application programming interface (API) to communicate with host systems 120A and 120B of system architecture 100, as well as to user portals, databases, directory servers and various other components, which are omitted from FIG. 1 for clarity.

Virtualization manager 110 may include storage management functionality that manages the storage occupied by disk images 132. The functions described herein may be performed by virtualization manager 110 or may be initiated by virtualization manager 110 and may be performed by another device, such as one of the hosts or a device of storage domain 130.

In one example, virtualization manager 110 may include a storage task initiation component 112 and a task duplication avoidance component 114. Storage task initiation component 112 may be invoked by the virtualization manager 110 when adjusting the number of virtual machines or adjusting the amount of storage available for the virtual machines. Storage task initiation component 112 may initiate the creation of tasks on other devices and the tasks may modify data storage on storage domains 130 that are accessible to the other devices. Storage task initiation component 112 may involve generating a task identifier 150 and transmitting task identifier 150 within a request 152 to host 120A. The request may cause host 120A to create a task and to associate the task with the task identifier 150. Task duplication avoidance component 114 may use task identifier 150 to determine if a failure occurred during the creation, scheduling, or execution of the task, as discussed in more detail below in regards to FIG. 2. Components 112 and 114 may interact with one or more host systems 120A and 120B and one or more storage domains 130 to manage the storage occupied by disk images 132. The interaction may occur using request 152, reply 154, other communications, or a combination thereof.

Request 152 may be a signal or message sent from virtualization manager 110 to host 120A to initiate a creation of a task that modifies storage domain 130. The task may allocate a portion of data storage on storage domain 130 for use by the virtualization manager 110, hosts 120A, 120B, virtual machines 124A, 124B or a combination thereof. In one example, the task may involve forming a storage volume on storage domain 130. The storage volume may be used for an existing disk image 132 of a virtual machine and may correspond to a snapshot of a disk of the virtual machine at a point in time.

Request 152 may be transmitted to the host and may cause the host to create a new task and associate the task with an existing task identifier 150. The request may include task identifier 150, which may be any identifier that can be associated with a task and may distinguish the task from other tasks on a particular host, on all hosts, or within the system architecture 100. Request 152 may also include other information such as an identifier of a disk image (e.g., disk image 132 discussed below), a textual description of the disk image, an identifier for a volume, a size of storage, or a combination thereof.

Reply 154 may be a signal or message sent from host 120A to virtualization manager 110 that may provide information concerning the status of the request, status of a task, or a combination thereof. Information concerning the status of the request may indicate that the request was received, forwarded, waiting, processed, other status or combination thereof. Information concerning the status of the task may indicate that the task was created, scheduled, waiting, running, completed, other status or combination of statuses. In one example, each request 152 may correspond to one or more replies and if a reply is not received by the virtualization manager (e.g., missing reply), it may indicate a problem or failure has occurred (e.g., reply lost, storage error, host failure).

Each of the host systems 120A and 120B may comprise one or more processors communicatively coupled to memory devices and input/output (I/O) devices, as described in more details herein below with references to FIG. 6. Each of the host systems 120A and 120B may run a plurality of virtual machines 124A and 124B by executing a hypervisor (not shown) to abstract the physical layer, including processors, memory, and I/O devices, and present this abstraction to the virtual machines as virtual devices. The virtual machines 124A and 124B may execute a guest operating system that may utilize the underlying virtual devices, including virtual processors, virtual memory, and virtual I/O devices. One or more applications may be running on a virtual machine under the guest operating system. Each host system 120A, 120B may run a host management module 122A, 122B that manages and monitors various aspects of the host operation, including the storage, memory and network interfaces. In an illustrative example, host management modules 122A and 122B may be provided by a Virtual Desktop and Server Management (VDSM) daemon (not shown).

In certain implementations, host systems 120A and 120B may be grouped into one or more logical groups that may be also referred to as a "data center" or "cluster." A data center may represent the highest level of abstraction in a virtualization model. Each data center may be communicatively coupled, via the network 140, to one or more storage domains 130 storing disk images 132 for machines, such as virtual machines 124A and 124B.

The storage domains 130 are employed for storing one or more disk images 132, metadata 134, and lease area 136. Storage domains 130 may provide shared access to data storage space and may include block-based storage devices, file-based storage devices, or a combination thereof. Block-based storage devices may include one or more data storage devices (e.g., Storage Area Network (SAN) devices) and provide access to consolidated block-based (e.g., block-level) data storage. Block-based storage devices may be accessible over a network and may appear to an operating system of a host system as locally attached storage. File-based storage devices may include one or more data storage devices (e.g., Network Attached Storage (NAS) devices) and provide access to consolidated file-based (e.g., file-level) data storage that may be accessible over a network. In one example, storage domain 130 may employ block-based storage and disk images 132, domain metadata 134, and domain lease 136 that are provided by respective logical volumes. In another example, storage domain 130 may employ file-based storage and disk images 132, domain metadata 134, and domain lease 136 that are provided by one or more respective files.

Each disk image 132 (also referred to as a virtual disk image) may comprise one or more data storage portions 138A-N, as schematically illustrated by FIG. 1, for storing disk image data. In an example, each of the data storage portions may be a volume of persistent data storage and the disk image may represent a chain of volumes comprising one or more copy-on-write (COW) volumes (which may also be referred to as "layers"). From the perspective of a virtual machine, these volumes may appear as a single disk image, as the hypervisor presents the virtual disk to a virtual machine and implements the associated disk read-write operations. Initially, a virtual machine disk image may comprise one raw or COW volume, which may be made read-only before the first boot of the virtual machine. An attempt to write to a disk by a virtual machine may trigger adding a new COW volume ("layer") to the volume chain. The newly created volume may be made writable, and may store disk blocks or files which have been modified or newly created by the virtual machine after the previous volume ("layer") has been made read-only. One or more volumes may be added to the volume chain during the lifetime of the virtual machine. In some implementations, making the previous volume read-only (e.g., responsive to receiving a command via an administrative interface) triggers adding of a new COW volume. The virtual disk device implemented by the hypervisor locates the data by accessing, transparently to the virtual machine, each volume of the chain of volumes, starting from the most recently added volume.

Each of the disk images 124A and 124B may store and organize information that may be loaded onto a machine (e.g., virtual machine or physical machine) and may be executed by the machine to provide a computing service. In one example, a disk image may be generated by creating a sector-by-sector copy of a source medium (e.g., hard drive of example machine). In another example, a disk image may be generated based on an existing disk image and may be manipulated before, during, or after being loaded and executed. The format of the disk images 124A and 124B may be based on any open standard, such as the ISO image format for optical disc images, or based on a proprietary format. Each disk image 124A and 124B may be associated with one or more computer programs (e.g., operating systems, applications) and configuration information (e.g., configuration files, registry keys, state information). The configuration information may include state information that indicates the state of one or more running programs at a point in time or over a duration of time. Each state may be the same or similar to a snapshot of the machine at a particular point in time or over a duration of time. In one example, the snapshot may store the state of a machine in a manner that enables it to be portable to other computing devices, so that when the other computing devices load the snapshot it may function as if it were running on the original device.

Metadata 134 of the storage domains 130 may be employed for storing references to associated volumes (e.g., to parent or child volumes in a copy-on-write chain) and/or other information that may be utilized for volume identification, management, creation, modification, removal, and/or for performing data modification operations (e.g., file operations) with respect to the data stored on the volumes 138A-N in the storage domain 130.

The lease area 136 of the storage domains 130 may be employed for storing the information that may be utilized for managing access to the data storage portions 138A-N in the storage domain 130. In certain implementations, each of the shared storage domains 130 may provide a centralized locking facility (e.g., lease manager) to prevent conflicting access by host systems 120A and 120B. By obtaining a lease from the lease manager with respect to the storage domain 130, a host system may receive exclusive access to the storage domain that would prevent other hosts from accessing the storage domain while the lease is active. A lease may have a certain expiration period and may be extended by the requestor. Failure to timely extend a lease may lead to the expiration of the lease. The state of the current lease with respect to a given storage domain may be stored in the lease area 136 of the storage domain.

Figure 2:
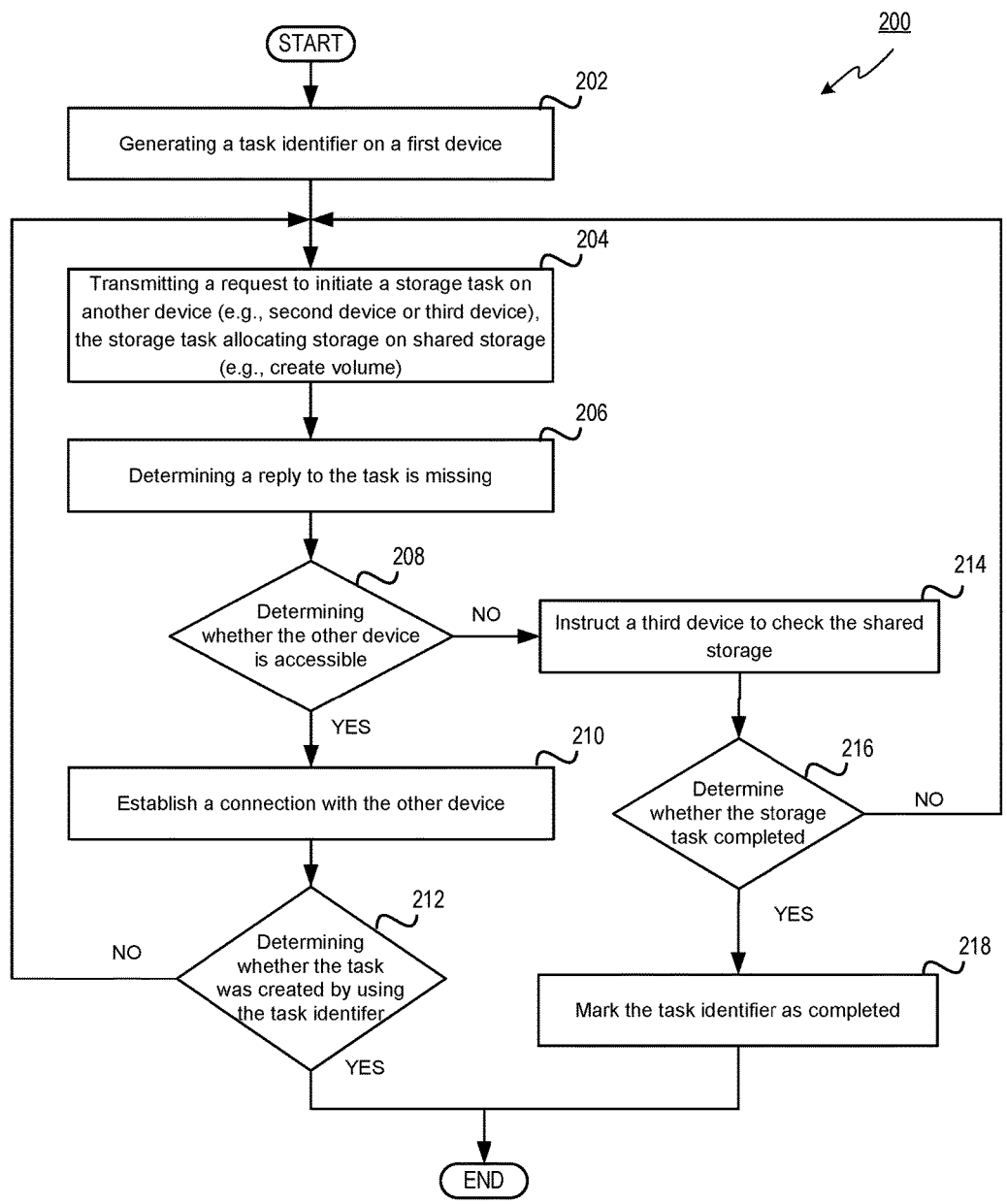
FIG. 2 depicts a flow diagram of a method for using task identifiers to manage tasks and ensure storage modifications occur without unnecessary task duplication, in accordance with one or more aspects of the present disclosure.
Figure 3:
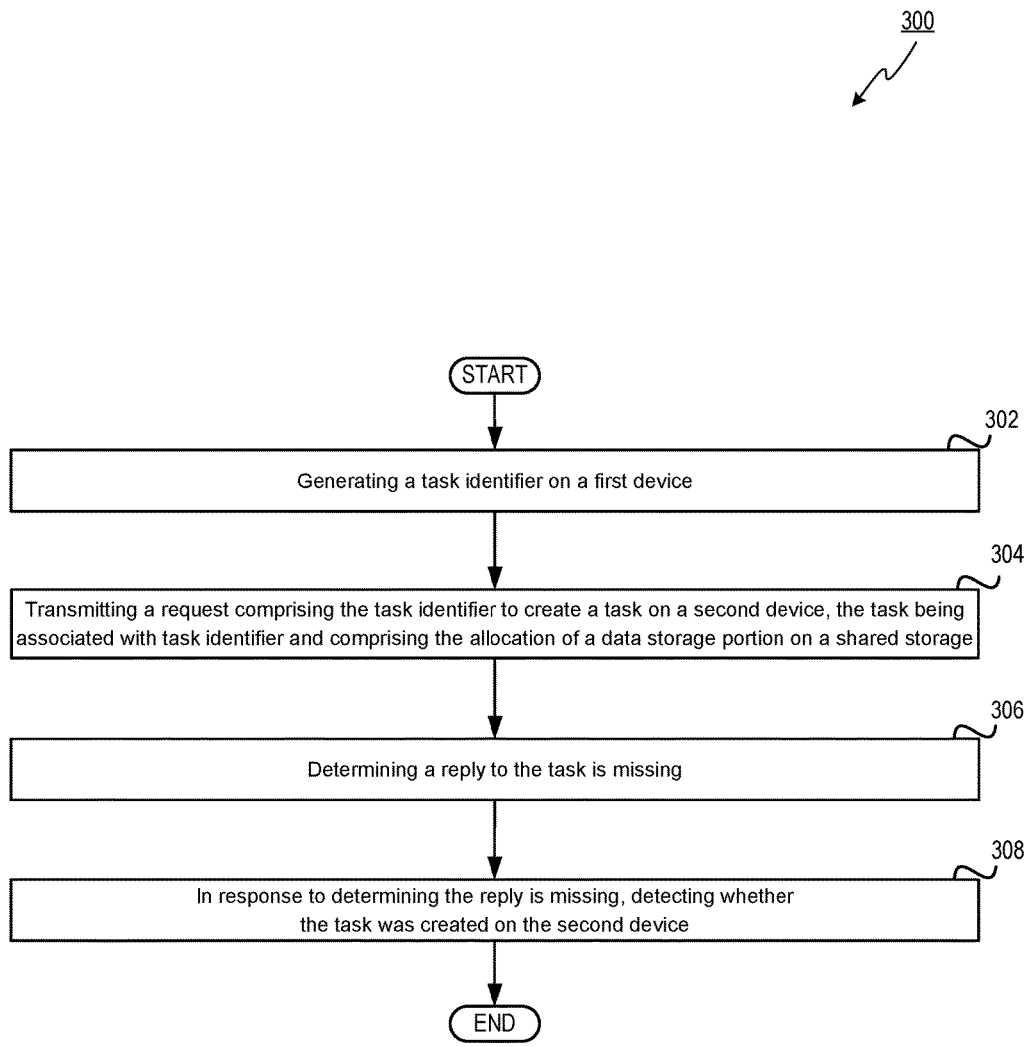
FIG. 3 depicts a flow diagram of a method for using task identifiers to manage tasks, in accordance with one or more aspects of the present disclosure.
Figure 4:
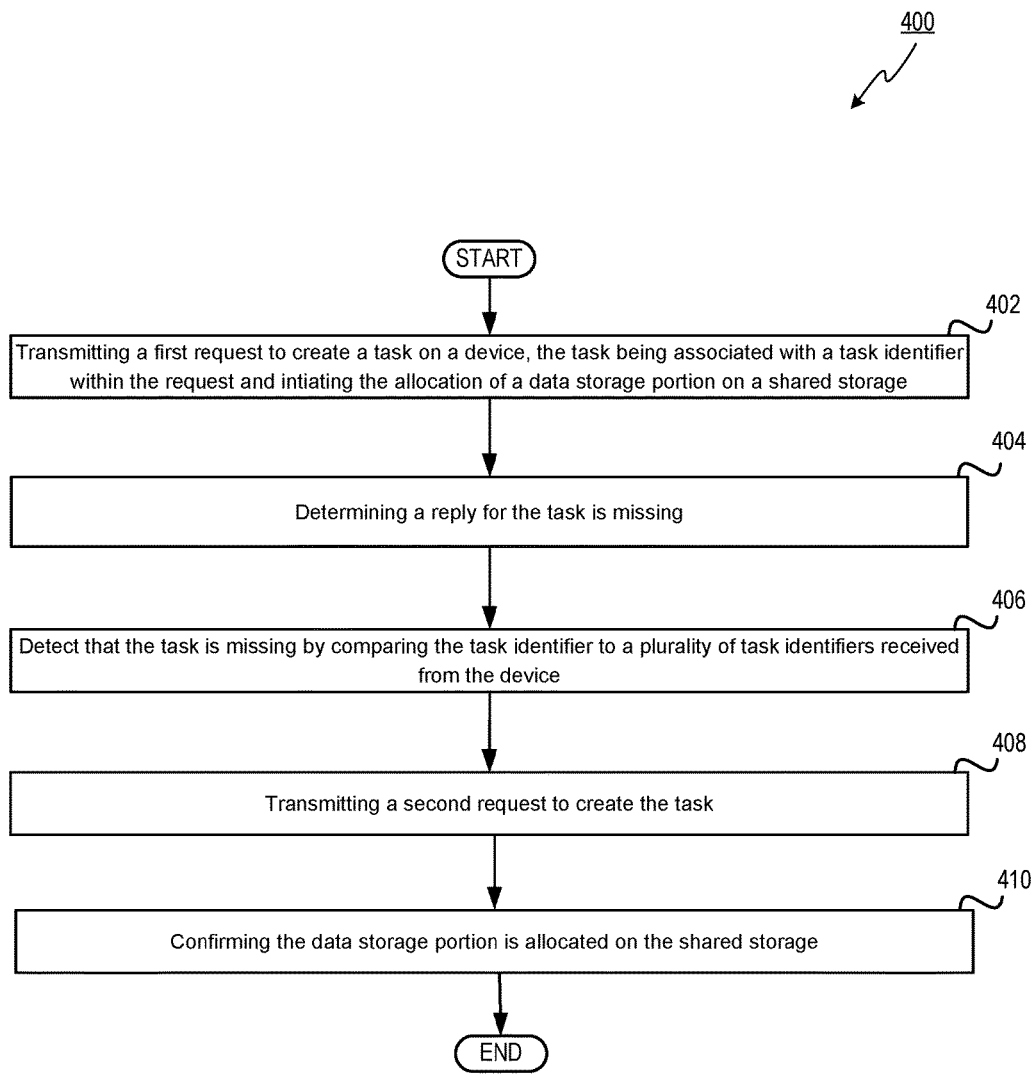
FIG. 4 depicts a flow diagram of another method for using task identifiers to manage tasks, in accordance with one or more aspects of the present disclosure.

FIGS. 2, 3, and 4 depict flow diagrams for illustrative examples of methods, 200, 300, and 400 for using task identifiers to avoid duplication of tasks and for determining whether the task successfully modify shared storage, in accordance with one or more aspects of the present disclosure. Method 200 includes a method of initiating the creation of a task to run on another device to modify shared storage and determining whether the task was created based on a task identifier. Method 300 and method 400 may be similar to method 200 and may include more or less implementation details. Methods 200, 300, and 400 may be performed by processing devices that may comprise hardware (e.g., circuitry, dedicated logic), computer readable instructions (e.g., run on a general purpose computer system or a dedicated machine), or a combination of both. Methods 200, 300, and 400 and each of their individual functions, routines, subroutines, or operations may be performed by one or more processors of the computer device executing the method. In certain implementations, methods 200, 300, and 400 may each be performed by a single processing thread. Alternatively, methods 200, 300, and 400 may be performed by two or more processing threads, each thread executing one or more individual functions, routines, subroutines, or operations of the method.

Figure 5:
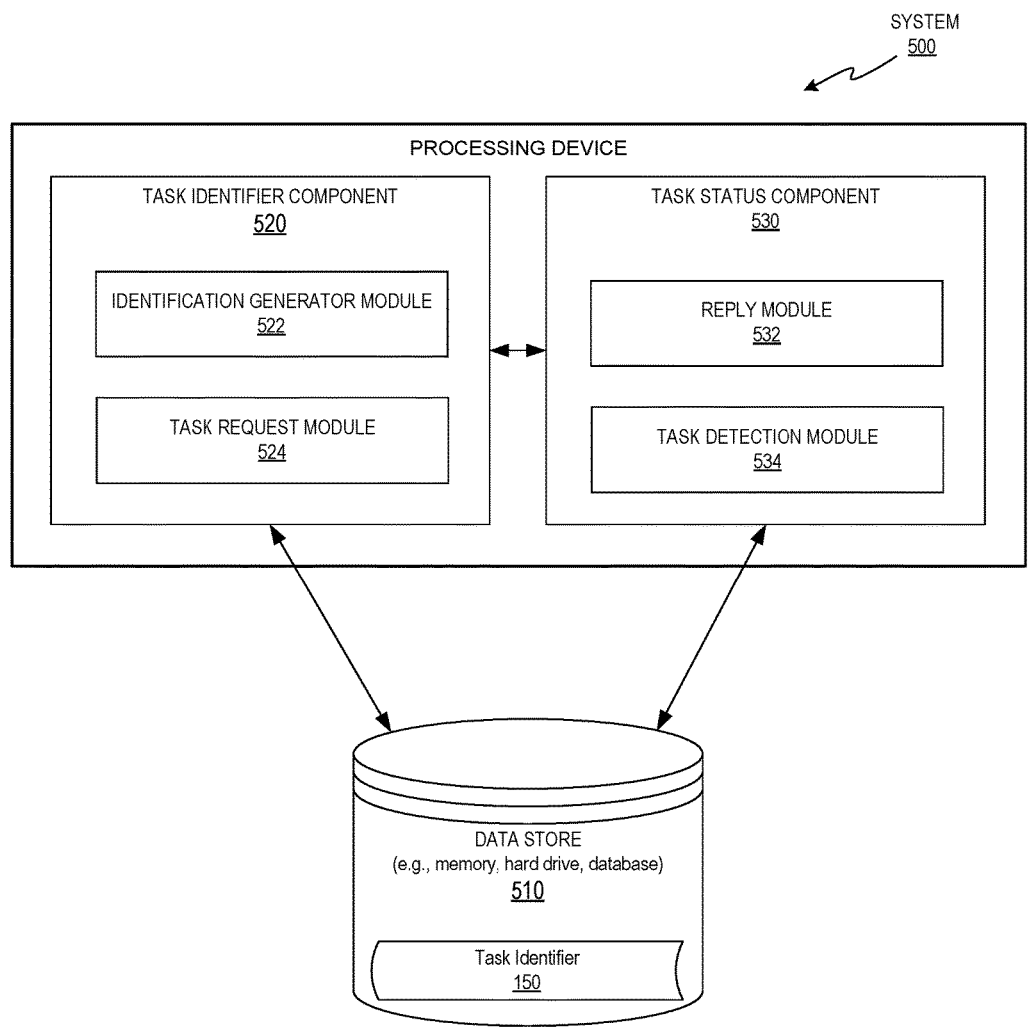
FIG. 5 schematically illustrates an example system using task identifiers to manage tasks, in accordance with one or more aspects of the present disclosure.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 200, 300 and 400 may be performed by virtualization manager 110, system 500, or system 600 as shown in FIGS. 1, 5, and 6 respectively.

Referring to FIG. 2, method 200 may be performed by processing devices of a first device that may have determined that additional storage space may enhance the operation of a new or existing virtual machine running on a second device and may have triggered method 200, which may begin at block 202. At block 202, a processing device may generate a task identifier on a first device. The first device may be a virtualization manager or other management device that organizes access and use of data storage. The task identifier may be any data (e.g., numeric, alphanumeric, binary, or character data) that can be associated with a task and may distinguish the task from other tasks. In one example, the task identifier may be a unique identifier (UID), globally unique identifier (GUID), or other identifier that is unique among all identifiers used for tasks. The task identifier may be generated in view of sequential numbers, random numbers, date or time information, device information, other information or a combination thereof.

At block 204, a processing device may transmit a request to initiate the creation of a storage task on another device (e.g., second device or third device) to allocate storage on shared storage (e.g., create a volume). The other device may be any device (e.g., host) with access to shared storage and the ability to modify the shared storage. The ability to modify storage on shared storage may involve allocating, de-allocating, formatting, unformatting, reformatting, configuring, other modification, or a combination thereof. In one example, the first device may not be able to directly modify shared storage because the first device may not have access to the shared storage or may not include components (e.g., device drivers, mount points) for modifying the shared storage. Instead, the first device may initiate the creation of tasks that are run on devices that are capable of modifying the shared storage. In another example, both the first device and the second device may be capable of modifying the shared storage and the first device may distribute tasks for other reasons, such as to load balance or enhance efficiency.

At block 206, a processing device may determine a reply to the task is missing. Each request may be associated with a reply, which may indicate a status of the request or a status of the new storage task. The processing device may expect a reply for each request and when the reply is not received within a predefined time interval, the processing device may consider the reply missing. A missing reply may indicate a failure occurred in the processing of the request or in the processing of the task. The failures may include, for example, one or more of: transmission failures (e.g., networking failure); host failures (e.g., power loss, operating system failure, application failure); storage failures (e.g., insufficient storage space, permission errors, data corruption); other failure; or combination thereof. Although a missing reply may indicate that a failure occurred, not all failures may result in the failure of the execution of the storage task. For example, a failure may have affected the transmission of the reply message but the request may have been received and the storage task may have been created, scheduled and completed successfully.

At block 208, a processing device may determine whether the other device (e.g., second device) is accessible. The other device should have received the request to initiate the storage task, and determining whether the other device is accessible may be a part of a troubleshooting process to determine why the reply is missing or whether the task already completed. In one example, the processing device may determine whether the other device is accessible by initiating a connection with the device that is expected to be performing the task. In another example, the processing device may determine whether the other device is accessible, by sending a message without initiating a connection. The message may be a message that invokes a response and may be similar to an internet control message protocol (ICMP) message or other message (e.g., packet). In either example, when the device is not accessible, the process may proceed to block 214, and when the device is accessible, the processing device may proceed to block 210.

At block 210, a processing device may establish a connection with the other device. The connection may be any communication channel that is capable of transporting information between the devices and may use any underlying communication protocol (e.g., Internet Protocol (IP), Transmission Control Protocol (TCP)). The connection may be used to gather information about the tasks that exist on the device.

At block 212, a processing device may determine whether the task was created on the second device by using the task identifier. A task may be created if the request was received by the other device, and the task identifier was recorded by the other device (e.g., in a local or remote data store). Once the task is created, it can be scheduled, running, completed or undergoing any other form of processing by the other device. Determining whether the task was created may involve querying the second device for a set of created tasks and receiving a plurality of task identifiers. The second device may receive a query from the first device and may access a local or remote data store (e.g., database, file, memory location) to identify one or more tasks that were created on the second device. In one example, the second device may access one or more task data structures that store information (e.g. task identifiers, task status) related to the created tasks and compiles a list of task identifiers associated with the one or more created tasks. In another example, the second device may access an index or mapping object that indicates the task identifiers for the tasks that were created by the second device on the second device. In either example, the second device may then package the task identifiers into a set and send the set to the first device.

The processing device of the first device may receive the set of task identifiers corresponding to the created tasks and compare the task identifier of the task at issue (e.g., included within the original request) to the set of task identifiers to determine if the task identifier has a match, which indicates the task was created. In an alternative example, determining whether the task was created may involve querying the second device for a particular task identifier to determine if the second device includes a task corresponding to the particular task identifier. In either example, if the task is determined to not have been created on the second device, the processing device may proceed back to block 204 and transmit another request to create a storage task on a device. The device may be the same device (e.g., second device) or it may be another device (e.g., third device) with access to the shared storage. If the task is determined to have been created on the second device, the processing device may complete and avoid transmitting another request (e.g., duplicate request) to create the storage task or a similar storage task (e.g., same task but different task identifier).

At block 214, a processing device may instruct a third device to check the shared storage in response to determining the other device (e.g., second device) is no longer accessible. Checking the storage may be an alternative way to determine whether the storage task was created because when the results of the storage task are detected at the shared storage, the processing device may determine that the storage task was created, scheduled, run, and completed. In one example, block 214 may be reached because the second device may have crashed or may have been rebooted. This may have occurred before receiving the request to create the task, after receiving the request to create the task, while the task was running, after the task completed or at any other point in time.

At block 216, a processing device may determine whether the storage task has completed. This may involve the third device accessing and analyzing the shared storage. The analysis may involve inspecting the shared storage to identify recently allocated data storage portions (e.g., new storage volumes) and comparing these data storage portions to a data storage portion that should have been allocated by the storage task at issue. The analysis of the shared storage may indicate whether the storage task completed. In one example, the analysis may determine the task completed and that the requested portion of data storage was allocated and the new storage volume was created. In another example, the analysis may determine that the storage task has not completed. The storage task may have begun executing one or more operations associated with the storage task but may have not completed all of the operations of the storage task. For example, the task may have allocated a portion of data storage but may have not completed the formation of a storage volume or finished associating (e.g., linking) the storage volume with a corresponding disk image of a virtual machine.

When a storage task fails to complete, the processing device of one of the devices (e.g., first device, second device, third device, or storage device) may execute a recollection process. The recollection process (e.g., garbage collector) may release storage associated with an incomplete storage task and may back out or clean up any changes associated with the incomplete storage task (e.g., remove a reference to a partially created volume). The recollection process may be advantageous because it may reduce the amount of wasted storage resources and reduce the occurrences of data corruption.

When the processing device determines that the storage task did not complete, the processing device may proceed back to block 204 and transmit another request to initiate a creation of a storage task on a device. The request may be transmitted to the same device (e.g., second device) or another device (e.g., third device). When the processing device determines that the storage task did complete, the processing device may proceed to block 218.

At block 218, a processing device may mark the task identifier as completed. As discussed above, the task identifier may be stored by the first device. For example, the task identifier may be stored in a data store (e.g., database) on the first device or accessible to the first device. The task identifier may be associated with information indicating a status of the corresponding task. Marking the task identifier as completed may involve the processing device updating the information indicating the status of the corresponding task as complete. Responsive to completing the operations described herein above with references to block 218, the method may terminate.

Referring to FIG. 3, method 300 may be performed by processing devices of a first device that may have determined that additional storage space may enhance the operation of a new or existing virtual machine running and may have triggered method 300, which may begin at block 302. At block 302, a processing device may generate a task identifier on a first device. The task identifier generated on the first device may be transmitted to a second device and assigned to a task that is created on the second device. The first device may manage one or more other devices including the second device. In one example, the first device may perform virtualization management functions and the second device may host a virtual machine and may perform tasks that allocate a storage for the virtual machine.

At block 304, the processing device may transmit a request comprising the task identifier to create a task on the second device. The request may include the task identifier for the task and the task may be associated with the task identifier. In one example, the task may involve the allocation of a data storage portion on shared storage. The shared storage may include at least one of a block-level storage device or file-level storage device accessible over a network. In another example, the task may also be associated with a process of creating a storage volume and the allocation of the data storage portion may be a part of creating a storage volume. Creating the storage volume may also involve formatting, initiating, configuring, or other data processing to prepare the storage volume for use. In one example, the task may involve forming a new storage volume for an existing virtual disk image of a virtual machine. The new storage volume may store information for a snapshot of the virtual machine. In another example, the task may involve forming a new storage volume for a new virtual disk that may be configured and instantiated as a new virtual machine.

At block 306, a processing device may determine a reply to the task is missing. As discussed above with respect to block 206, each request may be associated with a reply that may indicate a status of the request or a status of the new storage task. The processing device may expect a reply for each request and the processing device may consider the reply missing if the reply is not received. In one example, the processing device of the first device may execute a computing process (e.g., thread) that synchronously initiates the task and waits for the reply from the second device before continuing. In another example, the processing device of the first device may execute a computing process that perform asynchronously and initiates the task and proceeds to perform other functions before the reply from the second device is received. In some examples, the computing process may include portions of execution that are synchronous and portions of execution that are asynchronous. For example, the computing process may operate synchronously when it initiates the task by waiting for the reply and once the reply is received it may transition to synchronous operation and perform other operations while the task is modifying the shared storage. In any of the examples, the computing process may wait for a threshold period of time (e.g., time out duration) before determining that the reply to the task is missing. The threshold period of time may be based on the duration of time between prior requests and their corresponding replies or other method for establishing a time-out duration.

At block 308, a processing device, in response to determining the reply is missing, may detect whether the task comprising the allocation of the data storage portion on the shared storage exists. The processing device may detect whether the task was created by contacting the device where the request was transmitted (e.g., second device). The detection procedure may include multiple steps. A first step may involve checking if the second device is accessible. When the second device is inaccessible, the processing device may contact a third device to determine whether the data storage portion is allocated on the shared storage domain. The third device may be similar to the second device and both may be worker hosts with access to shared storage and may both be managed by the first device. When the second device is accessible, the processing device may determine whether the task was created by using the task identifier that was generated on the first device. This may involve querying the second device for a set of tasks (e.g., all scheduled tasks). The processing device may then receive a plurality of task identifiers corresponding to the set of tasks on the second device and may compare the task identifier with the plurality of task identifiers. When the task identifier corresponds to a task on the second device, the processing device may update the status information to indicate the task identifier was created. When the task identifier does not correspond to one of the plurality of task identifiers, the processing device may determine the task was not created on second device and may reinitiate the task on the second device or a different device. Responsive to completing the operations described herein above with references to block 308, the method may terminate.

Referring to FIG. 4, method 400 may be performed by processing devices of a computing device and may begin at block 402. At block 402, a processing device may generate a task identifier on a first device. The task identifier may be any data that can be associated with a task and may distinguish the task from other tasks. In one example, the task identifier may be a unique identifier (UID), globally unique identifier (GUID), or other identifier that is unique among all identifiers used for tasks. The task identifier may be generated in view of sequential numbers, random numbers, date or time information, device information, other information or a combination thereof.

At block 404, the processing device may initiate the creation of a task on a second device. The task being associated with a task identifier within the request and initiating the allocation of a data storage portion on a shared storage. Block 404 may be similar to block 304 and may involve transmitting the task identifier generated on the first device to a second device where it may be assigned a new task that is created on the second device. The first device may manage one or more other devices including the second device. In one example, the first device may perform virtualization management functions and the second device may host a virtual machine and may perform tasks that allocate a storage for the virtual machine.

At block 406, a processing device may determine a reply for the task is missing. Each request may be associated with a reply, which may indicate a status of the request or a status of the new storage task. The processing device may expect a reply for each request and when the reply is not received the processing device may consider the reply missing. A missing reply may indicate a failure occurred in the processing of the request or in the processing of the task. The failures may include, for example, one or more of: transmission failures (e.g., networking failure); host failures (e.g., power loss, operating system failure, application failure), storage failures (e.g., insufficient storage space, permission errors, data corruption), other failure or combination thereof.

At block 406, a processing device may detect that the task is missing by comparing the task identifier to a plurality of task identifiers received from the device. The comparison may indicate that there are no tasks corresponding to the particular task identifier. This may occur if the request to initiate the task was never received by the second device and therefore the task was never created.

At block 408, a processing device may transmit a second request to create the task. The second request may be the same or similar to the original request (e.g., first request). The second request may include the same task identifier that was sent in the first request or it may include a new task identifier. The new task identifier may be a new identifier generated in the same manner as the first task identifier or the new task identifier may be derived from the first task identifier. For example, the second task identifier may be the first task identifier plus additional information indicating it is a subsequent attempt. (e.g., UID_v2). The second request may be transmitted to the same device as the first request (e.g., second device) or may be sent to a different device (e.g., third device).

At block 410, a processing device may confirm the data storage portion is allocated on the shared storage. In one example, the processing device may confirm the data storage portion was allocated on the shared storage by querying the device that was performing the task to determine if the task completed. In another example, the processing device may confirm the data storage portion was allocated on the shared storage by contacting a third device. The third device may then be instructed to analyze the shared storage to determine whether the shared storage includes the data storage portion (e.g., new volume). The third device may then transmit a message to the first device that indicates whether the data storage portion was allocated on the shared storage. Responsive to completing the operations described herein above with references to block 410, the method may terminate.

FIG. 5 illustrates an example system 500 in which implementations of the disclosure may operate. System 500 may include a data store 510, a task identifier component 520, and a task status component 530. Data store 510 may be any non-persistent data storage (e.g., memory) or persistent data store (e.g., hard disk, database) that is capable of storing one or more task identifiers 150 and information associated with the task identifier 150 (e.g., status information). Task identifier component 520 may include an identification generator module 522 and a task request module 524. Task status component 530 may include a reply module 532 and a task detection module 534. The components and modules may interact with one another and one or more other components or modules to avoid duplication of tasks for modifying storage on a shared storage device.

Identification generator module 522 may generate a task identifier. A task identifier generated on a first device may be transmitted to a second device and assigned to a task that is created on the second device. The first device may manage one or more other devices including the second device. In one example, the first device may perform virtualization management functions and the second device may host a virtual machine and may perform tasks that allocate a storage for the virtual machine.

Task request module 524 may initiate a creation of a task on another device. Task request module 524 may initiate the task by transmitting a request to a second device, which initiates the creation of the task on the second device. The request may include the task identifier for the newly created task. The new task may be associated with or assigned the task identifier and the task may involve the allocation of a data storage portion on a shared storage. The task may also be associated with a process of creating a storage volume and the allocation of the data storage portion may be a part of creating a storage volume. Creating the storage volume may also involve formatting, initiating, configuring, or other data processing to prepare the storage volume for use. In one example, the task may involve forming a new storage volume for an existing virtual disk image of a virtual machine. The new storage volume may store information for a snapshot of the virtual machine. In another example, the task may involve forming a new storage volume for a new virtual disk that may be configured and instantiated as a new virtual machine.

Reply module 532 may be notified when task request module 524 transmits the request and may determine when a reply to the task is missing. As discussed above with respect to block 206 and 306, each request may be associated with a reply that may indicate a status of the request or a status of the new storage task. Reply module 532 may expect a reply for each request and may determine the reply is missing if the reply is not received. In one example, the processing device of the first device may execute a computing process that synchronously initiates the task and waits for the reply from the second device. The computing process may wait for a threshold period of time (e.g., time out duration) before determining that the reply to the task is missing. The threshold period of time may be based on the duration of time between prior requests and their corresponding replies or other method of for establishing a time-out duration.

Task detection module 534 may detect whether the task was created in response to determining the reply to the task is missing. Task detection module 534 may determine whether the task was created by contacting the device where the request was transmitted (e.g., second device). Detecting whether the task was created may involve checking if the second device, which was previously sent the request, is accessible. When the second device is inaccessible, task detection module 534 may contact a third device to determine whether the data storage portion is allocated on the shared storage domain. The third device may be similar to the second device and both may be worker hosts with access to shared storage and may both be managed by the first device. When the second device is accessible, task detection module 534 may determine whether the task was created by using the task identifier that was generated on the first device. This may involve querying the second device for a set of tasks (e.g., all scheduled tasks). The processing device may then receive a plurality of task identifiers corresponding to the set of tasks on the second device and may compare the task identifier with the plurality of task identifiers. When the task identifier corresponds to a task on the second device the processing device may update the status information to indicate the task identifier was created. When the task identifier does not correspond to one of the plurality of task identifiers, the processing device may determine the task was not created on second device and may reinitiate the task on the second device or a different device.

Figure 6:
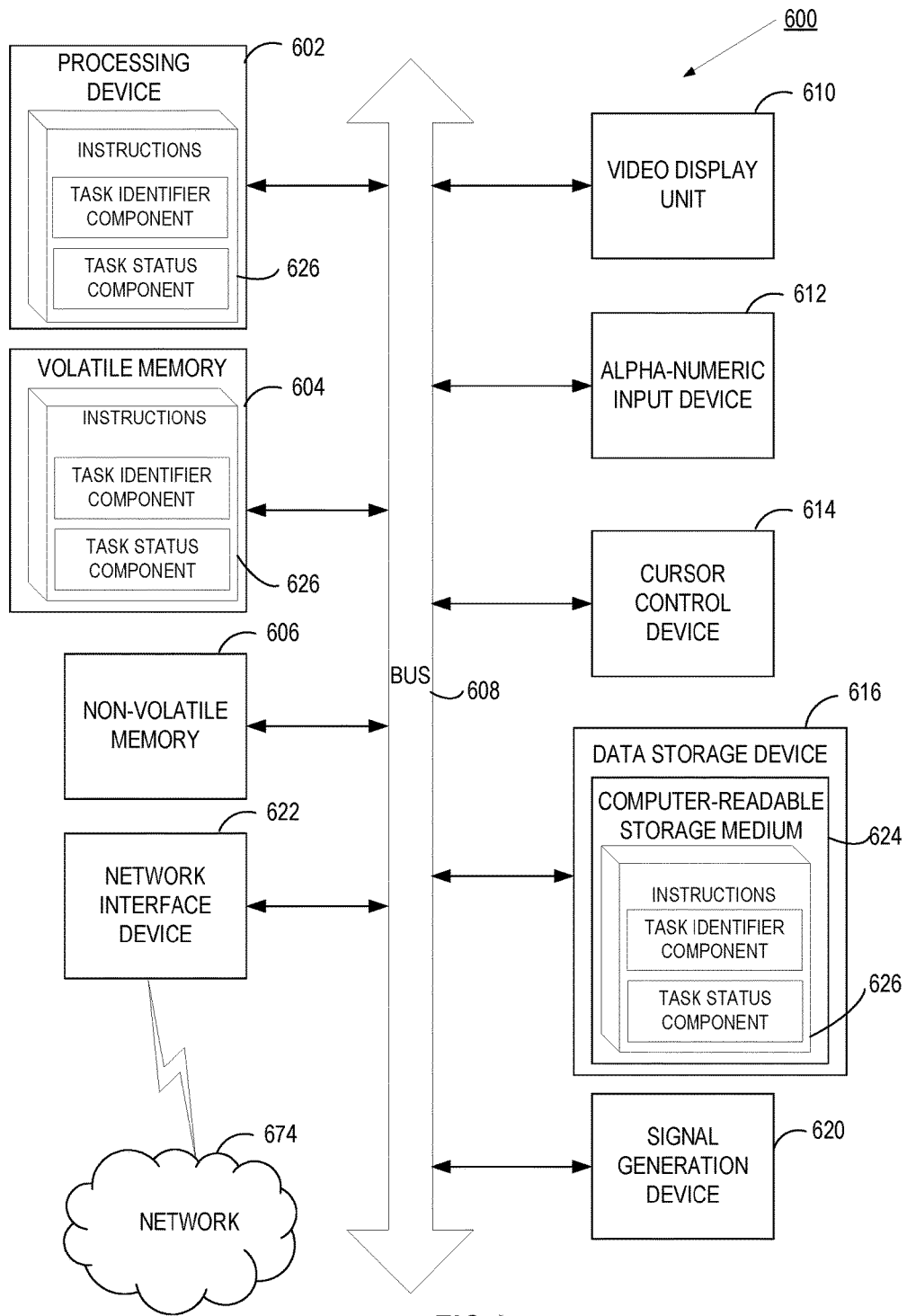
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to virtual manager 110 (e.g., first device) of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding task identifier component 520 and task status component 530 of FIG. 1 for implementing methods 200, 300, or 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "detecting," "initiating," "marking," "generating," "confirming," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    generating a task identifier on a first device;
    transmitting a request to initiate creation of a task on a second device, wherein the request comprises the task identifier to be associated with the task;
    determining, by a processing device, that a reply for the task is missing, wherein the task comprises allocating a data storage portion on a shared storage;
    querying the second device for a set of created tasks in response to determining the reply is missing, wherein the set comprises a plurality of task identifiers; and
    in response to the task identifier matching one of the plurality of task identifiers, avoiding transmission of another request to initiate the creation of the task.

2. The method of claim 1, wherein the task further comprises forming a storage volume on the shared storage, the shared storage comprising at least one of a block-level storage device or file-level storage device.

3. The method of claim 2, wherein the task further comprises associating the storage volume with an existing disk image of a virtual machine.

4. The method of claim 3, wherein the storage volume comprises information for a snapshot of the virtual machine.

5. The method of claim 1, wherein the first device manages the second device and the second device performs the task to allocate the data storage portion on the shared storage.

6. The method of claim 1, wherein the plurality of task identifiers correspond to a set of scheduled tasks.

7. The method of claim 6, further comprising:
    in response to the task identifier not matching one of the plurality of task identifiers, determining the task was not created and transmitting another request to create the task on the second device.

8. The method of claim 1, further comprising:
    detecting whether the second device is accessible after determining the reply to the task is missing; and
    in response to the second device being inaccessible, contacting a third device to determine whether the data storage portion is allocated on the shared storage.

9. The method of claim 1, wherein the first device performs virtualization management functions and the second device hosts a virtual machine.

10. The method of claim 1, wherein transmitting the request to initiate creation of the task comprises a computing process on the first device synchronously initiating the creation of the task and waiting for the reply from the second device.

11. A system comprising:
    a memory;
    a processing device operatively coupled to the memory, the processing device to:
        generate a task identifier on a first device;
        transmit a request to initiate creation of a task on a second device, wherein the request comprises the task identifier to be associated with the task;
        determine a reply for the task is missing, wherein the task comprises allocating a data storage portion on a shared storage; and
        query the second device for a set of created tasks in response to determining the reply is missing, wherein the set comprises a plurality of task identifiers; and
        in response to the task identifier matching one of the plurality of task identifiers, avoid transmission of another request to initiate the creation of the task.

12. The system of claim 11, wherein the task identifier generated on the first device is assigned to the task created on the second device.

13. The system of claim 11, wherein the first device performs virtualization management functions and the second device hosts a virtual machine.

14. The system of claim 11, wherein the task further comprises forming a storage volume on the shared storage, the shared storage comprising at least one of a block-level storage device or file-level storage device.

15. The system of claim 14, wherein the task further comprises associating the storage volume with an existing disk image of a virtual machine.

16. The system of claim 15, wherein the storage volume comprises information for a snapshot of the virtual machine.

17. A non-transitory machine-readable storage medium storing instructions that cause a processing device to:
    generate a task identifier;
    transmit over a network a first request to initiate creation of a task on a device, wherein the first request comprises a task identifier to be associated with the task;
    determine a reply for the task is missing, wherein the task comprises allocating a data storage portion on a shared storage;
    query the device for a set of created tasks, wherein the set comprises a plurality of task identifiers received from the device over the network;
    in response to the task identifier matching one of the plurality of task identifiers, avoiding transmission of a second request to create the task; and
    confirm the data storage portion is allocated on the shared storage.

18. The non-transitory machine-readable storage medium of claim 17, wherein the task further comprises a formation of a storage volume on the shared storage, the shared storage comprising at least one of a block-level storage device or file-level storage device.

19. The non-transitory machine-readable storage medium of claim 17, wherein the device comprises access to the shared storage and performs the task to allocate the data storage portion on the shared storage.

20. The non-transitory machine-readable storage medium of claim 17, wherein the task further comprises a formation of a new storage volume for an existing disk image of a virtual machine.

* * * * *